United States Patent Office 3,556,664
Patented Jan. 19, 1971

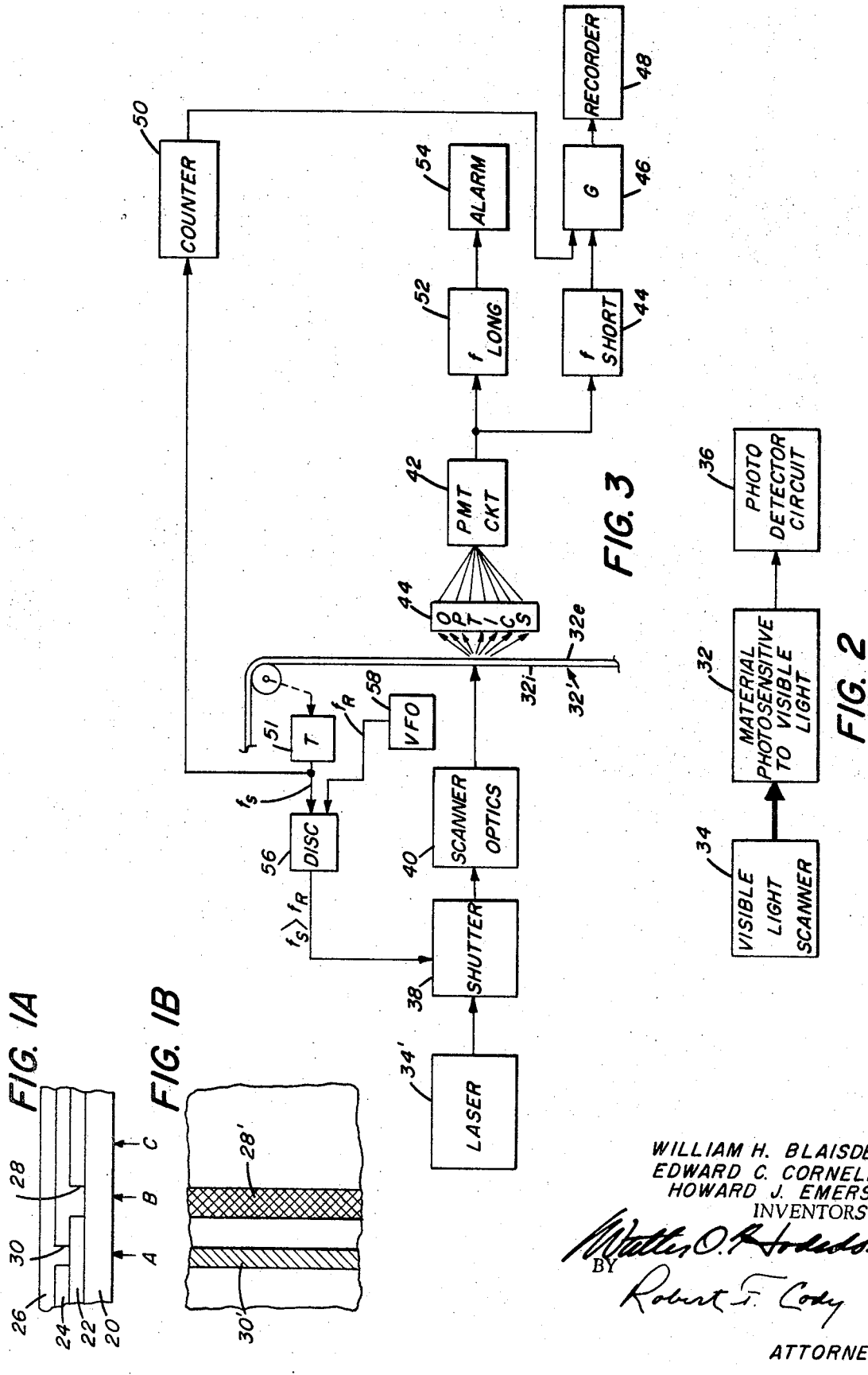

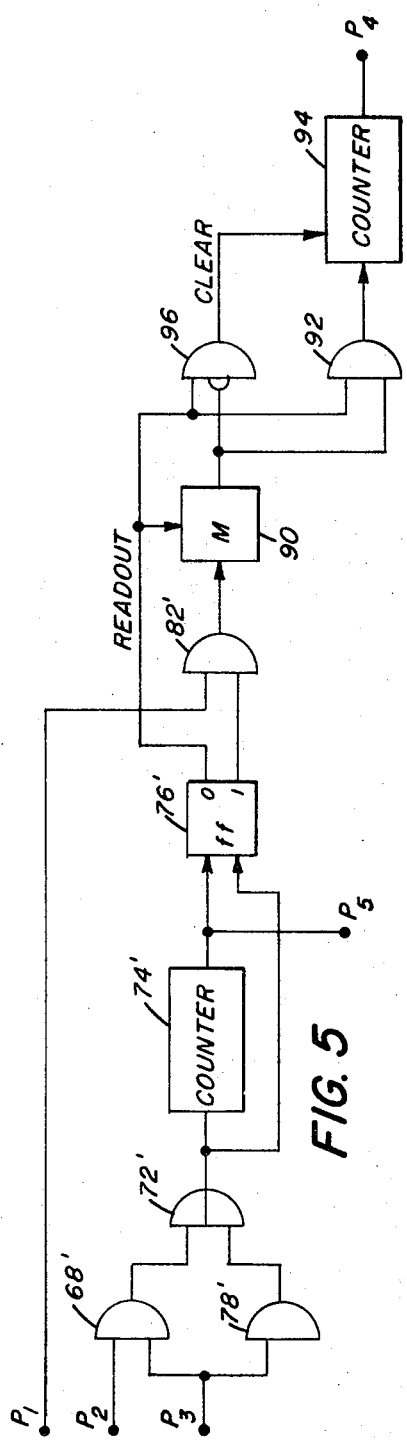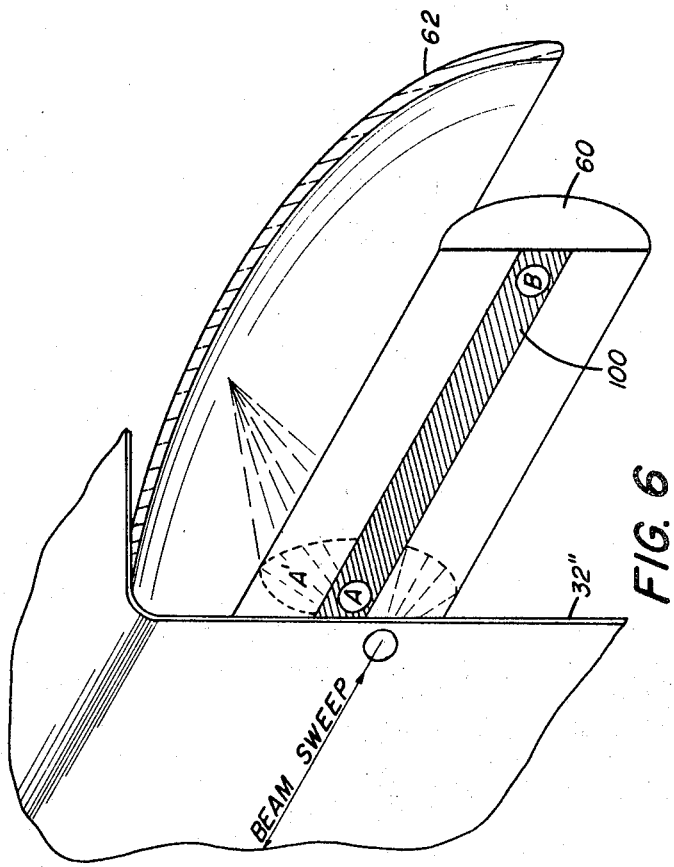

3,556,664
METHODS AND APPARATUS FOR INSPECTING PHOTOGRAPHIC MATERIALS
William H. Blaisdell, Edward C. Cornelius, and Howard J. Emerson, Rochester, N.Y., assignors to Eastman Kodak Company, Rochester, N.Y., a corporation of New Jersey
Filed Apr. 1, 1969, Ser. No. 812,107
Int. Cl. G01n 21/06, 21/16, 21/32
U.S. Cl. 356—200                                17 Claims

ABSTRACT OF THE DISCLOSURE

Reciprocity-law failure permits photographic material to be inspected by light to which such material is sensitive. Cast in the environment of a "visible light" scanning system for detecting skips in the sensitized color coats of a photographic web, apparatus according to the invention defines what is to be detected as a defect. As disclosed, visible light is directed at and through a photographic web, the dispersed light exiting from such web being gathered by a cylindrical lens which is so masked that it may be employed, without modification, for webs of various widths.

BACKGROUND OF THE INVENTION

(1) Field of the invention

Figure 4:
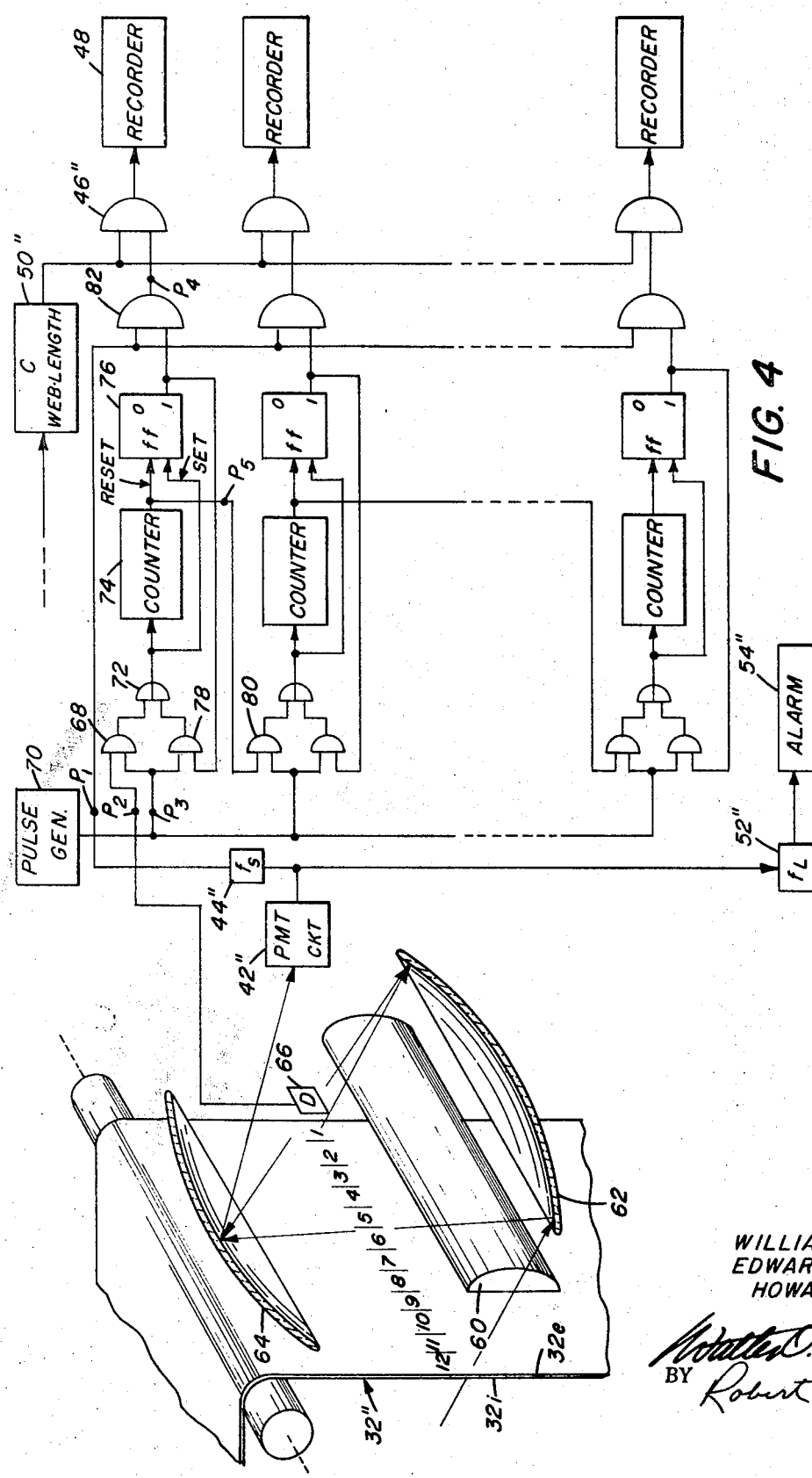

This invention relates generally to inspection means and methods; and in particular provides improved apparatus and methods for use in upgrading the quality of photosensitive materials and webs thereof.

(2) Description relative to the prior art

Various techniques have been indicated in the prior art for inspecting photosensitive webs: U.S. Pat. 3,206,606 indicates a system for checking for surface defects of a web by use of light reflected off the web surface; U.S. Pat. 3,286,567 indicates an arrangement for checking for the presence of streaks and the like in the sensitized coating of a web by use of light transmitted through such web.

The invention is especially concerned with—but not limited to—checking whether one or more of a plurality of different color-sensitive coatings is absent (hereinafter frequently referred to as a color-coat loss) from a light-transmissive photographic web, whereby a color-stripe or the like will undesirably appear on a portion of the web after that portion is photographically developed. An inspection system of the kind indicated in U.S. Pat. 3,206,606 is of no use in checking for color-coat losses, since color-coat defects are usually not surface oriented; an inspection system, whereby say an innocuous infrared light beam is shone through a photo-sensitized web to reveal defects in its coating—in the manner of U.S. Pat. 3,286,567—is also of no avail for the reason that color-coats, and losses thereto, are invisible to infrared energy.

It has been found that a skip in one or more of a plurality of different photosensitive color-coats of a composite web coating is visible only to light in the range of wavelengths to which the color-coats are themselves photosensitive, thereby posing a dilemma the solution to which may be found in the invention.

SUMMARY OF THE INVENTION

Aside from providing a way for detecting color-coat losses, and the like, apparatus and methods according to the invention may include one or more of the following additional features:

(a) definition of what is, and what is not, to be detected as a color-coat loss, (b) distinction between the complete loss, or thinning, or thickening of a color-coat, and streak-producing color-coat losses, (c) utilization of either or both of the above features in a system for inspecting webs of variable widths, there being no need to modify such system to accommodate such variable width webs.

Color-coat losses and the like are detected, in accordance with the invention, by use of (visible) light having a wavelength to which the color-coats are themselves sensitive; and to prevent latent images from ruining the color-coats under inspection, the invention employs to advantage "reciprocity-law failure," discussed in "The Theory of the Photographic Process," Mees and James, The MacMillan Company, New York, N.Y., chapters 4 and 7.

As is known, the processed optical density of a photosensitive coating varies as a function of its exposure to light to which it is sensitive; and that exposure (E) is defined as the product of exposure intensity (I) multiplied by exposure time (T): Reciprocity-law failure means that, regardless of what is its exposure E, a photosensitive coating will not produce a latent image therein if—for a given exposure intensity—the time of exposure is kept below a certain amount. In making use of reciprocity-law failure, the invention suggests the rapid scanning of a color-coated web with a beam of high-intensity visible light, which beam passes through the web and its coatings. The scanning sweep rate is kept sufficiently high to prevent the color-coats under inspection from being photographically excited; and since each color-coat absorbs the beam to a varying degree, any change which may occur in such absorptions—as would occur say at loss of a color-coat—is immediately detectable.

In defining what is to be detectable as a color-coat loss, the invention takes recognition of the fact that a color-coat loss is primarily objectionable from a product quality standpoint when in the form of a streak; and that such streaks are distinguishable, say from relatively unobjectionable randomly disposed slubs or the like which may appear in the product base, by virtue of the fact that streaks alone produce detectable modulation of the scanning beam on successive sweeps thereof across the web, whereas the slubs etc. do not.

Since color-coat streaks are usually localized defects, which may be selectively cut out of the web at the time the web is sliced, packaged and otherwise prepared for sale to customers, the invention suggests cataloging the location of such streaks for later removal, rather than require a complete shutdown of the web-handling equipment for each and every color-coat streak which may develop. A complete loss, or thinning or thickening, of a coat, however, must be caught immediately so that operation of the coating equipment may be halted, and corrective action taken. Accordingly the system of the invention channels high frequency "streak" signals to memory equipment to record the presence and location of such color-coat streaks; signals representing low frequency degradation of color-coats, as will occur with complete loss, or thinning or thickening, of a color-coat, are channeled to an alarm device for operation thereof as soon as such color-coat degradation appears.

Surface and internal irregularities of a scanned web cause scattering of the light which passes through the web. A cylindrical lens is employed to gather the scattered light for focusing upon a photodetector. It is desirable that only "scattered" light be focused upon the photodetector because the intensity of such light is sufficiently attenuated (by the web) to prevent the photodetector from being over-excited. For a given inspection system—capable of inspecting webs of a certain widthwise dimension—to inspect webs of a lesser widthwise dimension, measures must be taken to assure that the cylindrical lens so employed gathers and focuses only scattered light, thereby to avoid periodically over-exciting the photodetector when the scanning beam is off the web. Whereas adjustable beam blanking or masking techniques would suffice to assure that only scattered light reaches the photodetector, such techniques are comparatively cumbersome to implement, and naturally require adjustment for the various width sizes. In accordance with one of the features of the inventional system, the need for such adjustable techniques is obviated by the judicious location of a non-adjustable mask which is so disposed along the length of the cylindrical lens that only attenuated scattered light is transmittable by the lens.

An object of the invention is to provide improved apparatus and methods for use in inspecting the quality of photographic materials.

Another object of the invention is to provide a system and method for inspecting photographically sensitive material by use of radiation to which said material is sensitive.

Another object of the invention is to provide an inspection system for indicating streak defects in a photographic web.

Another object of the invention is to provide a system for inspecting photographic webs, which system detects and catalogs streak-type web defects, and alarms when defects wider than a prescribed amount occur.

Another object of the invention is to provide, in a web inspection system employing a scanning beam which is adapted to pass through a web to a photodetector to reveal defects in such web, a cylindrical lens for gathering and focusing the light exiting from such web, and which lens is so masked that the system may easily accommodate webs of different widths.

The invention will be described with reference to the figures wherein

FIGS. 1A and 1B are, respectively, cross-sectional and plan views of photographic material; and which views are useful in describing the invention, FIG. 2 is a block diagram illustrating the general concept of the invention, FIG. 3 is a block diagram illustrating a web inspection system; and which diagram emphasizes a particular aspect of the invention, FIG. 4 illustrates a logic circuit for providing certain other features of the invention, FIG. 5 indicates a logic circuit for providing still another feature of the invention, and FIG. 6 is a perspective view showing a preferred form of cylindrical lens for use in practicing the invention.

FIGS. 1A and 1B indicate the kind of web defects which are especially detectable by means of the invention. A base material 20 is coated with three photosensitive coats 22, 24 and 26 (and others, not shown) which are sensitive to respective wavelength bands of (visible) light. As indicated, a skip 28 appears in the coat 22; and a skip 30 appears in the coat 24. While such skips are not readily apparent to the naked eye in their unexposed forms, they nevertheless show up as colored stripes 28″, 30′ once the web is exposed and photographically developed. Energy, such as infrared energy, directed through the coated web at points A, B and C is equally attenuated by the web and its coats; and therefore cannot reveal the presence of color-coat losses 28 and 30. Visible light—disposed at points A, B and C—on the other hand is attenuated to varying degrees by the respective color-coats 22, 24, 26 and therefore provides a vehicle for detecting color-coat losses (provided of course that reciprocity-law failure is employed to prevent the creation of latent images in such coats).

Reference should now be had to FIG. 2 which indicates the general philosophy of the invention. Photographic material 32, e.g. film or paper webs thereof, is scanned by means of a source 34 of visible light, such light being attenuated by, but passing through, the material 32 to a photodetector circuit 36. The rate at which the photographic material 32 is scanned is kept sufficiently high to assure that latent photographic images are not formed in the material 32, the light which reaches the photodetector circuit 36 being modulated to reveal irregularities in such material. This philosophy (and ancillary ones) is embodied in the systems indicated respectively in FIGS. 3 through 6.

Referring to FIG. 3, a laser source 34′ of visible light, e.g. laser Model 124 by Spectra Physics, Inc., Mountain View, Calif., provides a visible radiant output (6328 A.) which is beamed through a shutter 38 to scanning optics 40. The optics 40, which may comprise a conventional rotating mirror assembly, sweeps the laser beam laterally across the face of a web 32′, the coating of which is to be inspected. The web 32′ is photosensitized, in the manner of FIG. 1A, and transmits its received light therethrough as indicated. Surface and internal irregularities of the web 32′ cause the light exiting therefrom to disperse; and which dispersed light is collected and focused upon the photodetector of a circuit 42 by means of optics 44.

Since the color coats 22, 24, 26 attenuate the (visible) light of the scanning beam to varying degrees, relatively narrow color-coat losses such as skips 28, 30 produce high frequency modulation of the light exiting from the web face 32e as the laser beam sweeps across the input face 32i of the web 32′. Such high frequency modulation causes the photodetector circuit 42 to produce short term color-coat skip signals; and such signals are applied through a filter 44 to open an AND gate 46 each time a short term skip is registered. When the gate 46 is turned on, a recorder 48 such as a magnetic memory or register stores a count representing the location along the length of the web where the skip in question appears. Web-location counts are provided by a counter 50 which is advanced by means of pulses derived from a tachometer 51, the speed of which is governed by the speed of travel of the web 32′.

Long term signals from the photodetector circuit 42, as may be produced when a whole color coat disappears or thins, are channeled through a filter 52 to an alarm 54, or equivalent device. A web which is missing a large part of one or more of its color coats has little that is salvageable; and so it is a feature of the invention to separate such long term signals from their short term counterparts, whereby more serious long term coating problems may be indicated (and corrected) as they occur.

To assure that reciprocity-law failure obtains, the invention employs the speed of the web 32′ to complement the rate at which the scanning optics 40 sweeps its beam across the input face 32i of the web 32′. Should the web speed fall below a certain prescribed low level, the shutter 38 is operated to blank the beam from the web. The shutter 38, which may for example be a blade-and-solenoid combination, is controlled by a discriminator 56, forms of which are well known to those skilled in the art. The discriminator 56 receives tachometer pulses at a frequency $f_s$; and pulses from an oscillator 58, at a reference frequency $f_r$, such reference frequency being consistent with a "safe" web speed that assures reciprocity-law failure. So long as the speed of the web 32′ is "safe" ($f_s > f_r$), the discriminator 56 applies no output to the solenoid of the shutter 38; when however the web speed falls to an "unsafe" level ($f_s < f_r$) the discriminator 56 produces and applies an output to cause the shutter 38 to close, thereby blanking the laser beam from the scanning optics 40.

In addition to distinguishing long and short term color-coat losses, and indicating the locations along the length of a web of such short term color-coat losses, the system of FIG. 4 defines the widthwise location across a web of such short term losses; and FIG. 4 defines further the focusing and collecting optics (44) indicated in FIG. 3.

Referring then to FIG. 4, the photosensitized web 32″ is divided into, for example, twelve widthwise channels. The scanning beam, whether modulated by color-coat losses or not, emanate from the (photosensitive) exit face 32"e of the web 32", and is scattered by irregularities in the web 32". A cylindrical lens 60 collects the scattered light and directs such light to a spherical mirror 62. The mirror 62 redirects its received radiation at a spot on a spherical mirror 64, which mirror in turn focuses the radiation upon the photodetector of a circuit 42". Signals representing long term color-coat losses are filtered (52") for alarm (54") purposes; and signals representing short term color-coat losses of the stripe-producing kind are filtered (44") for actuating individual recorders (48₁) for the respective channels 1–12.

As the laser beam begins its sweep across the input face 32"i of the web 32", it actuates a photodetector device 66. The photodetector device 66 thus arms an AND circuit 68 so that a first pulse from a clock pulse generator 70 may pass therethrough, and thence through an OR circuit 72 to a counter 74. Means may be provided to sync the clock pulse generator 70 to the speed of scanning, if such scanning speed is subject to change. The first clock pulse received by the counter 74 is also applied to set a flip-flop circuit 76 to its ONE state, whereby an AND circuit 78 is turned on to pass the second, third, etc. clock pulses through the OR circuit 72 to the counter 74. The counter 74 counts the pulses from the clock pulse generator 70 until it reaches a count consistent with the discrete width of the channel 1 of the web 32", at which time the counter 74 resets the flip-flop circuit 76 to its ZERO state; and turns on an AND circuit 80 so that clock pulses which occur while the beam scans the web channel 2 may be counted. It is seen that the flip-flop circuit 76 is held in its ONE state all the while that the beam is scanning the web channel 1; and during which time the flip-flop circuit 76 applies a gate-opening signal to an AND circuit 82. Signals representing short term color-coat losses which appear while scanning the web channel 1 cause the AND circuit 82 to turn an AND circuit 46" (in the manner indicated with respect to the system of FIG. 3) whereby a count—representing the location along the length of the web 32" where a color-coat defect has occurred—may be applied from a counter 50" to a channel recorder 48₁.

The respective circuits for the individual channel recorders (48₁) are armed in sequence; and since they are all alike, only the first thereof has been described. With the system of FIG. 4, not only is information as to where a defect occurs along the length of a web recorded, but by dividing the web into channels and providing respective circuits for such channels, the widthwise locations of such defects are registered as well.

Slubs or the like which have little or no bearing on product quality, and which appear on or within the base material (20) of a photographic web, may modulate the light emanating from such web, thereby causing the false recording of color-coat defects. Since such slubs etc. are distributed randomly about and within the web, they are distinguishable from color-coat losses—which are most troublesome when in the form of streaks—by the fact that streaks produce successive modulations for successive sweeps of the scanning beam, whereas discretely disposed slubs etc. do not. A circuit for making such distinctions, and which circuit is adapted to be substituted for the circuit disposed between the points P₁–P₅ of FIG. 4 is shown in FIG. 5. The circuit of FIG. 5 (which may be substituted similarly into each of the channels of the systems of FIG. 4) includes AND circuits 68', 78', 82', an OR circuit 72', a counter 74', and a flip-flop circuit 76' which cooperate as in the system of FIG. 4. Modulation signals which are received at the point P₁ during the inspection of a given web channel are applied to a memory device 90, e.g. a register; at the conclusion of each such channel inspection, i.e. when the flip-flop circuit 76' is reset to its ZERO state, the flip-flop circuit 76' pulses the memory device 90, thereby to gate any signal stored in memory through an AND circuit 92 to a counter 94. The counter 94 may be a two-stage counter which, after it stores two counts, produces a "streak" representative output pulse, thereby to gate a streak-location count from the counter 50" (FIG. 4) into the recorder 48₁ via the circuit 46".

A modulation signal, as occurs when the scanning beam sees a randomly disposed unobjectionable slub in a web channel, is processed as a first count into the counter 94; during the next subsequent sweep of that channel, however, the memory device 90, on being pulsed by the flip-flop circuit 76' produces no output signal, thus causing an inhibit gate circuit 96 to produce an output pulse to clear the counter 94. Thus, only when successive sweeps of a given channel produce modulation signals does the counter 94 produce an output for gating fault location information from the counter 50" into the recorder 48₁.

As indicated (FIG. 3) the light exited from the web is scattered, the cylindrical lens 60 (FIG. 4) serving to collect such scattered light for focusing upon the photodetector of the circuit 42". The lens 60 is shown in the shadow of the web 32"; and so all light which it receives is attenuated by means of the web 32". Were the widthwise dimension of the web 32" to be reduced so that the scanning beam would sometimes reach the photodetector of the circuit 42" without first passing through the web, the photodetector could be overilluminated, i.e. damaged or desensitized by the strong intensity light which it would see while the beam was off the web. To avoid such possibility, and thus permit the invention to be used for inspecting webs of different widths, various techniques suggest themselves: viz. masking that portion of the cylindrical lens which would directly see the beam when the beam is off the web; interrupting the beam at its source when the beam is not aimed at the web; etc. Such techniques are comparatively cumbersome, and require adjustment for the various web widths. A feature of the invention, as noted above, is to provide the cylindrical lens 60 with a mask 100 so disposed along its length that the mask receives unscattered light from the scanning beam whenever the beam is off the web, whatever may be the web width. Although a small quantity of scattered light is lost (area A) when scanning a web using this technique, most of the information-laden scattered light (area A') which passes through the web is focused upon the mirror 62 for processing. Contrarily should the beam fall off the web, without being scattered thereby, the mask 100 entirely blanks (area B) the beam from damaging-desensitizing the photodetector of the circuit 42".

The invention has been described in detail with particular reference to preferred embodiments thereof, but it will be understood that variations and modifications can be effected within the spirit and scope of the invention. For example, the web inspection systems of U.S. Pats. 3,206,606 and 3,286,567 could be modified to accommodate the abovedescribed invention (although the converse is not true); also whereas the above disclosure indicates that light is beamed upon the unsensitized face of a photographic web (to assure reciprocity-law failure), the beaming of light upon the sensitized face of such web would also be within the purview of the invention; etc.

What is claimed is:

1. The method of inspecting photographic material that is sensitive to light of a certain wavelength comprising the steps of
   (a) beaming substantially constant intensity light of said wavelength at said material,
   (b) substantially focusing said light of said wavelength at an aim point on said material,
   (c) scanning said material by relatively moving the aim point of said light beam transversely of said material at a rate which is sufficiently fast to prevent latent images from being formed in such material by means of said light, (d) detecting modulation of the light from the said material to produce a modulation signal representative of said light modulation, and (e) utilizing said modulation signal as an indication of the optical consistency of said material.

2. The method of optically inspecting a coating of photographic material which is sensitive to visible light by means of visible light, which coating is disposed on a light transmissive support having a transmittance, in the visible light range, which is different from the transmittance of the said coating, comprising the steps of (a) beaming visible light to pass through said coating and said support, (b) substantially focusing said visible light at an aim point on said material, (c) scanning said material by moving the aim point of said beam so that the light thereof never falls on any part of said coating for a time sufficient to create a latent image in the material of said coating, (d) detecting variations in the light which passes through said coating and said support to produce a modulation signal representative of the characteristics of the said coating, and (e) utilizing said modulation signal as an indication of the optical consistency of said material.

3. The method of claim 2 wherein the said support is photographically insensitive to visible light, and wherein the step of beaming comprises transmitting said beam of visible light through the support, and thence through the coating of photosensitive material.

4. Apparatus for detecting irregularities and the like in the sensitive coating of a light transmissive photographic web, which coating is sensitive to light within a given band of wavelengths and has a transmittance different than said web within that wavelength band comprising (a) a source of substantially even intensity light within the said wavelength band, (b) means for substantially focusing light within said wavelength band on said web, (c) means for sweeping light from said source within said wavelength band relative to said web at a rate which is sufficient to prevent latent images from being formed in said coating by said light, (d) means for detecting modulation of the light which passes through said web to produce a modulation signal indicative of said characteristics of said coating, and (e) means for utilizing the modulation signal.

5. The apparatus of claim 4 wherein said means for utilizing light modulation comprises (a) means for separating said modulation into long and short term components thereof, and (b) first and second means respectively responsive to register said long and short term components of said modulation.

6. The apparatus of claim 5 wherein said first means is an alarm, and wherein said second means is means for recording the occurrences of short-term modulation.

7. The apparatus of claim 4 including means for moving said photographic web while said web is swept with light, thereby further assuring that latent images will not form in said sensitive coating of said web.

8. The apparatus of claim 7 wherein said source is positioned with respect to said web that the light therefrom passes first through said web, and thence through said coating.

9. The apparatus of claim 8 including means responsive to the speed of motion of said web to block the light from said source to said web when the speed of said web falls below a certain amount.

10. Apparatus for detecting color-coat losses from a light-transmissive photographic web having thereon a plurality of color coats which are sensitive to respective wavelength bands of visible light comprising (a) a source of visible light, (b) focusing means for substantially focusing into a light beam the visible light from said source to a spot on said web and for directing said light beam through said web, (c) means for continually relatively moving the light beam with respect to said web to move the spot where said light impinges upon said web at a rate which is sufficient to prevent latent images from forming in any of the said color coats, (d) photodetector means to receive the light emanating from said web for producing a signal in relation to its received light, and (e) means for detecting modulation of said signal to produce a modulation signal, thereby to provide an indication of the respective consistencies of the said color coats.

11. The apparatus of claim 10 including means for separating said modulation signal into long-term and short-term signal components, and wherein said apparatus includes first and second register means responsive respectively to said long-term and short-term signal components.

12. The apparatus of claim 11 wherein said means for continually relatively moving the light beam with respect to said web comprises means to sweep said light beam substantially widthwise across said web, and wherein said apparatus includes (a) means for moving said web in the direction of its length, and (b) shutter means responsive to the lengthwise speed of said web to close when said web speed falls below a certain amount.

13. The apparatus of claim 11 wherein said first register means comprises alarm means, and wherein said second register means comprises means for storing said short-term signal components.

14. The apparatus of claim 13 wherein said means for separating said detected modulation into long-term and short-term signal components includes respective channels for receiving modulation signals from the various widthwise portions of the said web, and wherein said means for storing short-term signal components comprises respective storage devices for the respective channels.

15. The apparatus of claim 10 wherein said web is elongated, and wherein said apparatus includes means for moving said web in the direction of its length, said means for continually relatively moving the light beam with respect to said web comprises means to sweep said light beam widthwise back and forth across said web, said apparatus further including (a) means for separating said modulation into long-term and short-term signal components thereof, (b) first register means responsive to short-term signal components for registering each time a predetermined number of consecutive sweeps of said light beam across said web produces a short-term signal component, and (c) second register means responsive to long-term signal components of said modulation.

16. The apparatus of claim 15 wherein said first register means comprises storage means, and wherein said second register means comprises an alarm.

17. The apparatus of claim 10 wherein said web is elongated, and wherein said apparatus includes means for moving said web in the direction of its length, said means for continually relatively moving the light beam with respect to said web comprising means to sweep said light beam widthwise back and forth across said web, said apparatus further including a cylindrical lens having a longitudinal axis which is disposed transversely of the length of said web and said cylindrical lens positioned to receive light emanating from said web, said cylindrical lens including a mask so disposed lengthwise with respect to the longitudinal axis of said cylindrical lens that said mask lies in the path of said light in the absence of said web.

(References on following page)

References Cited

UNITED STATES PATENTS

| | | |
|---|---|---|
| 1,094,672 | 4/1914 | Milentz. |
| 2,393,631 | 1/1946 | Harrison et al. |
| 2,548,551 | 4/1951 | Morrison. |
| 2,680,200 | 6/1954 | Hercock. |
| 3,206,606 | 9/1965 | Burgo et al. |
| 3,257,563 | 6/1966 | Laurent. |
| 3,317,736 | 5/1967 | Herrick et al. |
| 3,510,664 | 5/1970 | Nichols. |

RONALD L. WIBERT, Primary Examiner

W. A. SKLAR, Assistant Examiner

U.S. Cl. X.R.

250—219; 356—202, 203, 237, 239